US009982548B2

(12) United States Patent
Ols et al.

(10) Patent No.: US 9,982,548 B2
(45) Date of Patent: May 29, 2018

(54) TURBINE VANES WITH VARIABLE FILLETS

(71) Applicant: UNITED TECHNOLOGIES CORPORATION, Hartford, CT (US)

(72) Inventors: John T. Ols, Northborough, MA (US); Karl A. Mentz, Medford, MA (US); Richard N. Allen, West Hartford, CT (US); Steven D. Porter, Wethersfield, CT (US); Renee J. Jurek, Colchester, CT (US); Paul K. Sanchez, Wellington, FL (US); Sandra S. Pinero, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 240 days.

(21) Appl. No.: 14/890,496

(22) PCT Filed: Jun. 25, 2014

(86) PCT No.: PCT/US2014/044039
§ 371 (c)(1),
(2) Date: Nov. 11, 2015

(87) PCT Pub. No.: WO2015/009418
PCT Pub. Date: Jan. 22, 2015

(65) Prior Publication Data
US 2016/0123166 A1    May 5, 2016

Related U.S. Application Data

(60) Provisional application No. 61/846,127, filed on Jul. 15, 2013.

(51) Int. Cl.
*F01D 9/04*    (2006.01)
*F01D 5/14*    (2006.01)
(Continued)

(52) U.S. Cl.
CPC ............... *F01D 9/041* (2013.01); *F01D 5/02* (2013.01); *F01D 5/143* (2013.01); *F01D 9/04* (2013.01);
(Continued)

(58) Field of Classification Search
CPC . F01D 9/04; F01D 9/041; F01D 5/143; F01D 5/145; F01D 25/246; F05D 2250/90; F05D 2240/80
See application file for complete search history.

(56) References Cited

U.S. PATENT DOCUMENTS 4,793,770 A    12/1988   Schonewald et al.
6,428,273 B1    8/2002   Keith et al.
(Continued)

FOREIGN PATENT DOCUMENTS

EP    1452693 A2    9/2004
EP    1688586 A1    8/2006

OTHER PUBLICATIONS

International Search Report for PCT Application No. PCT/US2014/044039 dated Oct. 24, 2014.
(Continued)

*Primary Examiner* — Woody Lee, Jr.
*Assistant Examiner* — Maxime Adjagbe
(74) *Attorney, Agent, or Firm* — Carlson, Gaskey & Olds, P.C.

(57) ABSTRACT

An airfoil extends between radially inner and radially outer platforms. The airfoil extends between a leading edge and a trailing edge, and merges into facing surfaces of the radially inner and outer platforms. A variable fillet merges a facing surface of one of the radially inner and outer platforms into a wall of the airfoil. The variable fillet has a length extending away from a surface of the airfoil and a height extending away from the facing surface of at least one of the radially (Continued)

inner and outer platforms outwardly on to the airfoil. The variable fillet has a greater length at one of the leading edge and the trailing edge. A spaced portion has a shorter length at locations spaced from at least one of the leading and trailing edges. A mid-turbine frame and a gas turbine engine are also disclosed.

22 Claims, 5 Drawing Sheets

(51) Int. Cl.
    *F01D 5/02*         (2006.01)
    *F01D 25/24*      (2006.01)

(52) U.S. Cl.
    CPC ........ *F01D 25/246* (2013.01); *F05D 2220/32* (2013.01); *F05D 2240/12* (2013.01); *F05D 2240/303* (2013.01); *F05D 2240/304* (2013.01); *F05D 2240/80* (2013.01); *F05D 2250/71* (2013.01); *F05D 2250/90* (2013.01); *Y02T 50/673* (2013.01)

(56) References Cited

U.S. PATENT DOCUMENTS

| | | | |
|---|---|---|---|
| 6,932,568 | B2 | 8/2005 | Powis et al. |
| 6,969,232 | B2 * | 11/2005 | Zess ................. F01D 5/145 |
| | | | 415/191 |
| 7,371,046 | B2 * | 5/2008 | Lee .................. F01D 5/143 |
| | | | 415/191 |
| 7,625,181 | B2 | 12/2009 | Matsuda et al. |
| 8,206,095 | B2 | 6/2012 | Parker et al. |
| 9,011,085 | B2 | 4/2015 | Suciu et al. |
| 2004/0081548 | A1 | 4/2004 | Zess et al. |
| 2006/0153681 | A1 | 7/2006 | Lee et al. |
| 2010/0303608 | A1 | 12/2010 | Kataoka et al. |
| 2011/0097205 | A1 | 4/2011 | Maddaus |
| 2012/0275922 | A1 | 11/2012 | Praisner et al. |
| 2013/0164137 | A1 | 6/2013 | Barnes et al. |

OTHER PUBLICATIONS

Supplementary European Search Report for European Application No. 14825846.0 completed Jun. 21, 2016.
International Preliminary Report on Patentability for International Application No. PCT/US2014/044039 dated Jan. 28, 2016.

* cited by examiner

TURBINE VANES WITH VARIABLE FILLETS

CROSS-REFERENCE TO RELATED APPLICATION

This application claims priority to U.S. Provisional Application No. 61/846,127, filed Jul. 15, 2013.

BACKGROUND

This application relates to a turbine vane.

Gas turbine engines typically include a fan delivering air into a compressor. The air is compressed and delivered into a combustion section where it is mixed with fuel and ignited. Products of this combustion pass downstream over turbine rotors driving them to rotate.

To control the flow of the products of combustion, turbine vanes are typically positioned between turbine rotors stages. The vanes serve to condition the flow of the products of combustion as they approach a downstream turbine rotor.

One known type of turbine vane is incorporated into a mid-turbine frame. A mid-turbine frame sits between a higher pressure turbine rotor and a lower pressure turbine rotor and typically includes a plurality of vanes. Each vane is defined by an airfoil extending between a radially inner and radially outer platform. The vanes extend from a leading edge to a trailing edge.

A fillet is defined which merges the airfoil into a facing surface of the platform. In the prior art, the fillets have typically been sized to be relatively large in a dimension extending perpendicularly away from the airfoil. The same is true for a height of the fillet extending upwardly on to an outer surface of the airfoil. The size of the fillet has been designed to address thrust concentrations, such as are found at a leading edge of the airfoil. The prior art has generally utilized a single uniform larger fillet size.

It is known to provide compound fillets having distinct sizes across a length of the airfoil.

SUMMARY

In a featured embodiment, a turbine vane has an airfoil extending between radially inner and radially outer platforms. The airfoil extends between a leading edge and a trailing edge, and merges into facing surfaces of the radially inner and outer platforms. A variable fillet merges a facing surface of one of the radially inner and outer platforms into a wall of the airfoil. The variable fillet has a length extending away from a surface of the airfoil and a height extending away from the facing surface of at least one of the radially inner and outer platforms outwardly on to the airfoil. The variable fillet has a greater length at one of the leading edge and the trailing edge. A spaced portion has a shorter length at locations spaced from at least one of the leading and trailing edges.

In another embodiment according to the previous embodiment, the greater length and the shorter length are measured from a meeting point of a nominal surface of at least one of the radially inner and outer platforms and the surface of the airfoil. The height is measured from the meeting point to an end of the fillet.

In another embodiment according to any of the previous embodiments, at least one of the leading and trailing edges is the leading edge.

In another embodiment according to any of the previous embodiments, a tapered portion tapers a length of the variable fillet from the portion associated with the leading edge to the spaced portion.

In another embodiment according to any of the previous embodiments, a ratio of the greater length to the shorter length is between 1.1 and 8.0.

In another embodiment according to any of the previous embodiments, the airfoil has a hollow. The variable fillet includes a core variable fillet merging an outer surface defining the hollow into the at least one of the radially inner and outer platforms.

In another embodiment according to any of the previous embodiments, the variable fillet is an outer variable fillet provided on a surface of the airfoil at one of the radially inner and outer platforms in what will be an airflow path.

In another embodiment according to any of the previous embodiments, the variable fillet is utilized at both of the radially inner and outer platforms.

In another embodiment according to any of the previous embodiments, the variable fillet also has a greater height at one of the leading edge and the trailing edge. The uniform portion has a shorter height at locations spaced from at least one of the leading and trailing edges.

In another embodiment according to any of the previous embodiments, a ratio of the greater height to the shorter height is between 1.1 and 6.0.

In another embodiment according to any of the previous embodiments, a ratio of said greater length to said greater height is between 1.1 and 4.

In another featured embodiment, a mid-turbine frame has a radially inner and a radially outer platform. The radially inner and outer platforms include a plurality of vanes, with each of the vanes including a portion of the radially inner and the outer platforms and an airfoil connecting the portions of the radially inner and outer platforms. The airfoils extend between a leading edge and a trailing edge, and merge into facing surfaces of the radially inner and outer platforms. A variable fillet merges a facing surface of one of the radially inner and outer platforms into a wall of the airfoil. The variable fillet has a length extending away from a surface of the airfoil and a height extending away from the facing surface of at least one of the radially inner and outer platforms outwardly on to the airfoil. The variable fillet has a greater length at one of the leading edge and the trailing edge. A spaced portion has a shorter length at locations spaced from at least one of the leading and trailing edges.

In another embodiment according to the previous embodiment, the greater length and the shorter length are measured from a meeting point of a nominal surface of at least one of the radially inner and outer platforms and the surface of the airfoil. The height is measured from the meeting point to an end of the fillet.

In another embodiment according to any of the previous embodiments, at least one of the leading and trailing edges is the leading edge.

In another embodiment according to any of the previous embodiments, a tapered portion tapers a length of the variable fillet from the portion associated with the leading edge to the spaced portion.

In another embodiment according to any of the previous embodiments, a ratio of the greater length to the shorter length is between 1.1 and 8.0.

In another embodiment according to any of the previous embodiments, the airfoil has a hollow, and the variable fillet includes a core variable fillet merging an outer surface defining the hollow into at least one of the radially inner and outer platforms.

In another embodiment according to any of the previous embodiments, the variable fillet is an outer variable fillet provided on a surface of the airfoil at one of the radially inner and outer platforms in what will be an airflow path.

In another embodiment according to any of the previous embodiments, the variable fillet is utilized at both of the radially inner and outer platforms.

In another embodiment according to any of the previous embodiments, the variable fillet also has a greater height at one of the leading edge and the trailing edge. The uniform portion has a shorter height at locations spaced from at least one of the leading and trailing edges.

In another featured embodiment, a gas turbine engine has a higher pressure turbine and a lower pressure turbine. A mid-turbine frame is positioned between the higher and lower pressure turbines. The mid-turbine frame mounts a bearing for supporting a shaft associated with at least one of the higher and lower pressure turbines. A radially inner and a radially outer platform include a plurality of vanes, with each of the vanes including a portion of the radially inner and the outer platforms and an airfoil connecting the portions of the radially inner and outer platforms. The airfoils extend between a leading edge and a trailing edge, and merge into facing surfaces of the radially inner and outer platforms. A variable fillet merges a facing surface of one of the radially inner and outer platforms into a wall surface of the airfoil. The variable fillet has a length extending perpendicularly away from a surface of the airfoil and a height extending away from the facing surface of at least one of the radially inner and outer platforms outwardly on to the airfoil. The variable fillet has a greater length at one of the leading edge and the trailing edge. A spaced portion has a shorter length at locations spaced from at least one of the leading and trailing edges.

In another embodiment according to the previous embodiment, the greater length and the shorter length are measured from a meeting point of a nominal surface of at least one of the radially inner and outer platforms and the surface of the airfoil. The height is measured from the meeting point to an end of the fillet.

In another embodiment according to any of the previous embodiments, at least one of the leading and trailing edges is the leading edge.

In another embodiment according to any of the previous embodiments, a tapered portion tapers a length of the variable fillet from the portion associated with the leading edge to the spaced portion.

In another embodiment according to any of the previous embodiments, a ratio of the greater length to the shorter length is between 1.1 and 8.0.

In another embodiment according to any of the previous embodiments, the airfoil has a hollow. The variable fillet includes a core variable fillet merging an outer surface defining the hollow into at least one of the radially inner and outer platforms.

In another embodiment according to any of the previous embodiments, the variable fillet is an outer variable fillet provided on a surface of the airfoil at one of the radially inner and outer platforms in what will be an airflow path.

In another embodiment according to any of the previous embodiments, the variable fillet is utilized at both of the radially inner and outer platforms.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

These and other features may be best understood from the following drawings and specification.

DETAILED DESCRIPTION

Figure 1A:
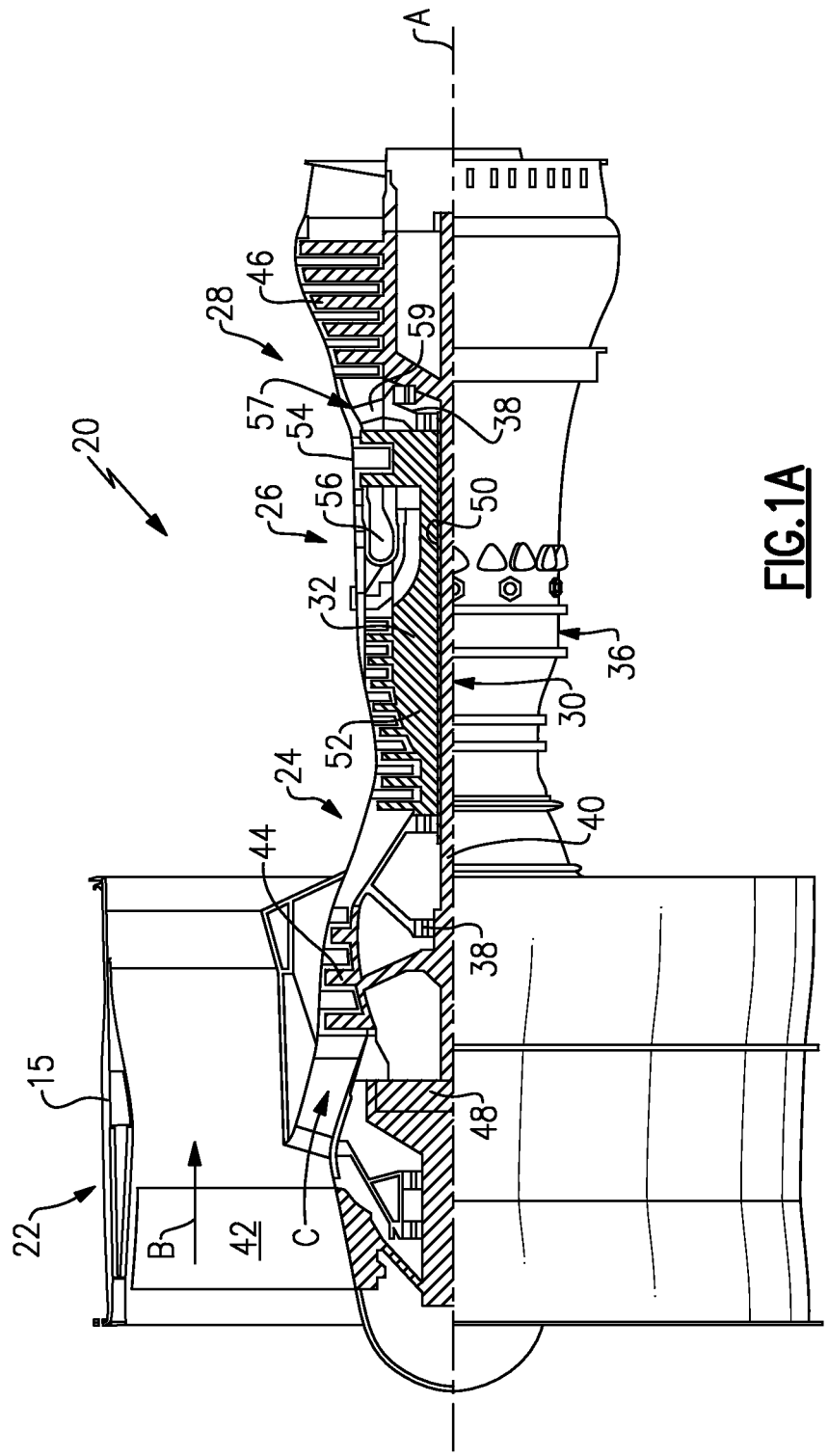
FIG. 1A shows a gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes. In the case of a three-spool engine, not shown in FIG. 1A, multiple mid-turbine frames 57 may exist between for example a high spool and an intermediate spool and an intermediate spool and a low spool. The various embodiments disclosed herein are capable of being applied to multiple such locations by one of ordinary skill in the art.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 1B:
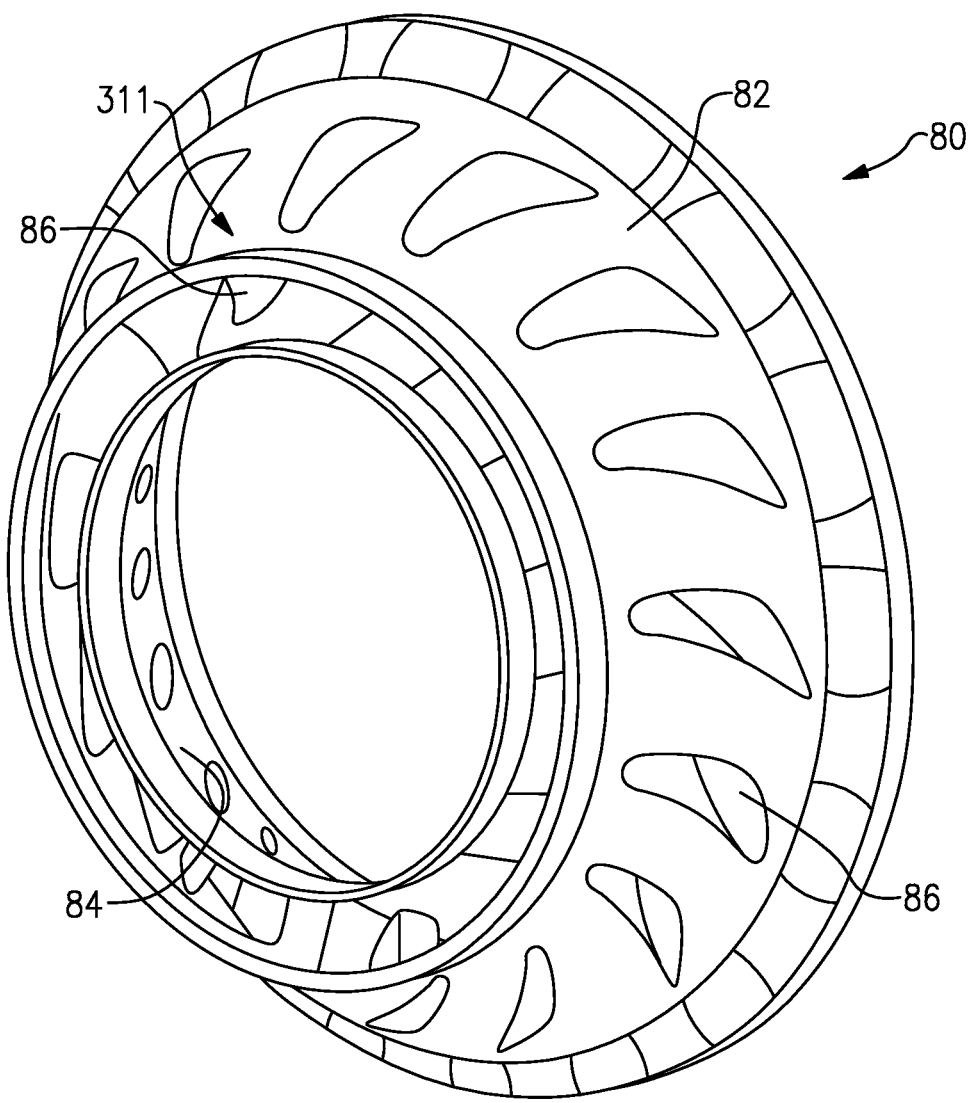
FIG. 1B shows a portion of a mid-turbine frame that includes the vanes and which may be incorporated into the gas turbine engine.

FIG. 1B illustrates a vane or gas path portion 80 of a mid-turbine frame. This may be a portion of the mid-turbine frame 57 in the FIG. 1A engine. The mid-turbine frame portion 80 may support a bearing through intermediate support structure. Alternatively, the bearing need not be supported in mid-turbine frame 57. An outer platform 82 is at a radially outer location and an inner platform 84 is at a radially inner location. The inner platform 84 supports the bearing 38, or the intermediate structure. A plurality of airfoils 86 extend between the platforms 82 and 84. The mid-turbine frame portion 80 includes a plurality of vanes 311, each defined as an airfoil 86 and portions of platforms 82 and 84. While mid-turbine frame portion 80 is disclosed, it should be understood that the teachings of this application would extend to separate vanes, as well as an entire mid-turbine frame. In one embodiment, the mid-turbine frame portion 80 is cast as a single part. Alternatively, the mid-turbine frame portion 80 may be formed by a plurality of individual vanes 311 joined together.

Figure 2:
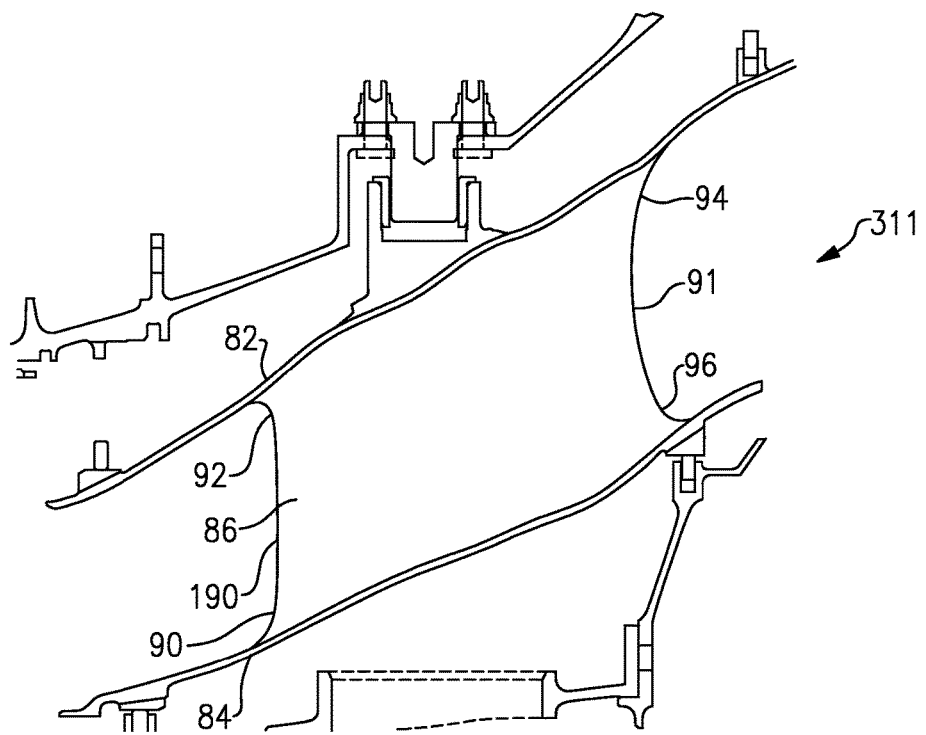
FIG. 2 shows a cross-section of FIG. 1B, with details of a vane.

FIG. 2 shows a detail of one vane 311 having airfoil 86. The airfoil 86 has a leading edge 190 and a trailing edge 91. The leading edge 190 extends to a radially outer leading edge 92 which merges into the radially outer platform 82, and a radially inner leading edge 90 which merges into the radially inner platform 84. Similarly, the trailing edge 91 has trailing edge portions 94 and 96 merging into the radially outer platform 82 and the radially inner platform 84, respectively.

Figure 3A:
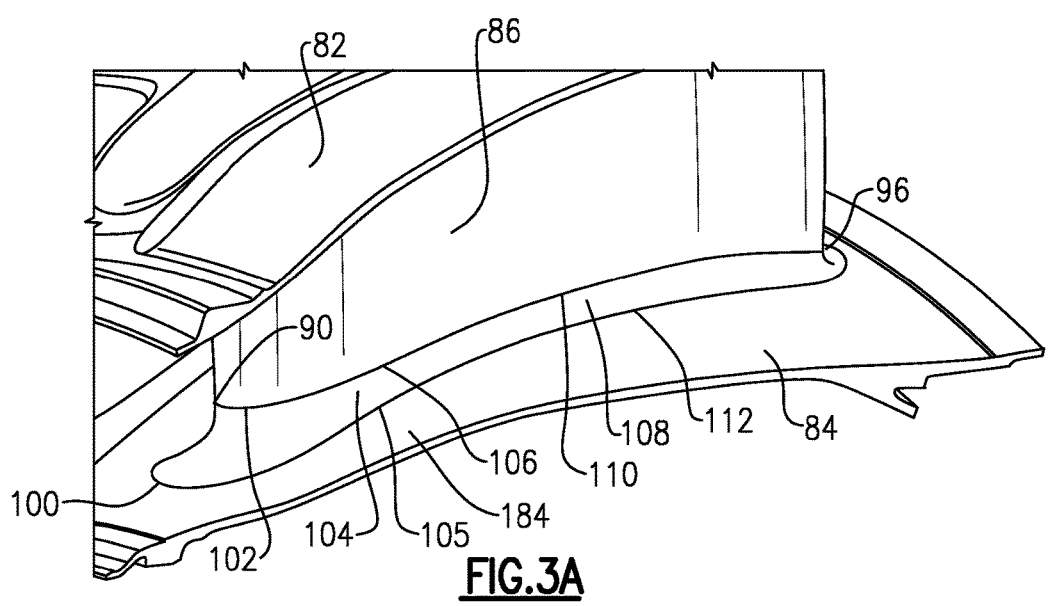
FIG. 3A shows a portion of the vane.

As shown in FIG. 3A, a fillet merges a surface 184 of the platform 84 to an outer surface of the airfoil 86. At the radially inner leading edge 90, the fillet extends a length measured perpendicularly away from the radially inner leading edge 90 to a point 100. Further, the fillet extends from the surface 184 of the platform 84 to a height 102. A transition or tapered portion 104 of the fillet is formed extending from the radially inner leading edge 90 toward the radially inner trailing edge 96. The tapered portion 104 is shown to have a length to an outer point 105 which is less than the length to the point 100 and a height to a point 106 which is less than the height 102.

Beyond the tapered portion 104 is a uniform portion 108 which extends to the radially inner trailing edge 96. The uniform portion 108 has a uniform length to a point 112 and a uniform height to a point 110. While the uniform portion 108 is defined as being "uniform," in practice, there may be some variation within this portion. For purposes of this application, the uniform portion 108 may also be referred to as a spaced portion. The spaced portion simply has fillet areas that have a shorter length than a fillet at one of the leading edge or trailing edge.

Figure 3B:
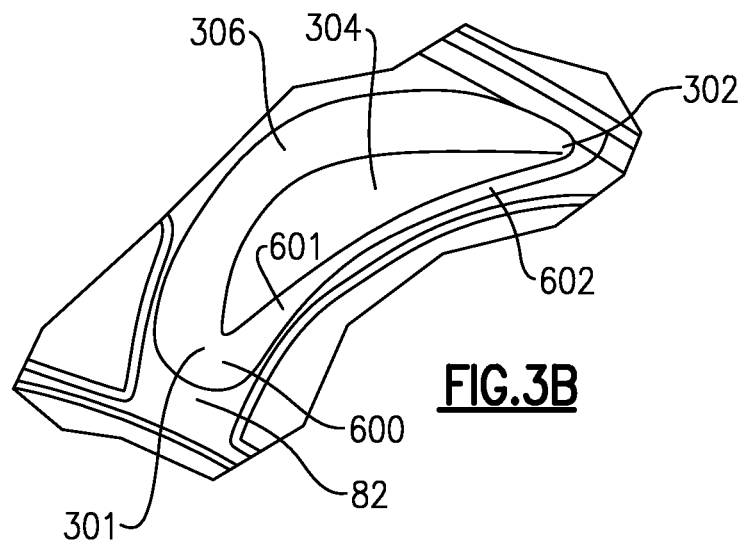
FIG. 3B shows another feature of the vane.

FIG. 3B shows that the vane has a hollow, with an outer surface 304 of the airfoil facing the hollow. There is a fillet 306 that merges the outer surface 304 of the hollow or core into an outer surface of the platform 82. There is a leading edge 301 and a trailing edge 302.

Figure 3C:
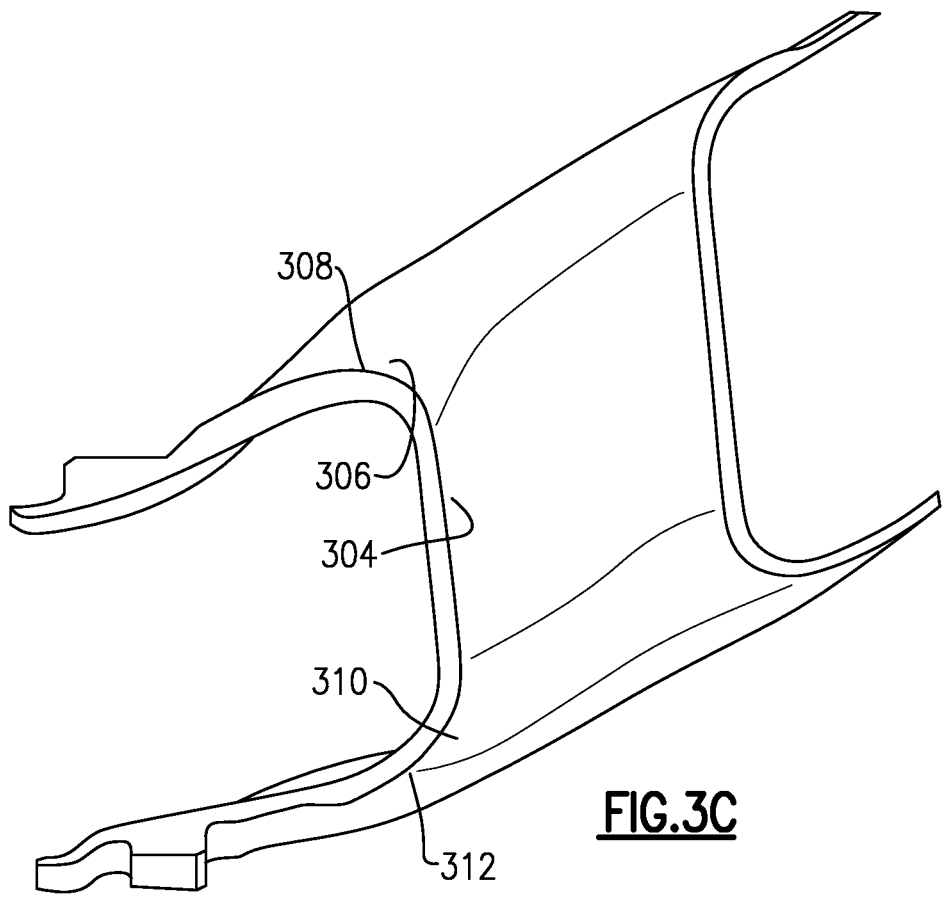
FIG. 3C is a cross-section through a portion of the FIG. 3B vane.

The fillet 306 can be appreciated from FIG. 3C, which further shows a similar fillet 312 at a radially inner end 310. The fillets 306 and 312 may have the enlarged portion 600 associated with the leading edge 301, the tapered portion 601, and then the constant portion 602 spaced toward the trailing edge 302, such as illustrated in FIG. 3B.

Figure 4A:
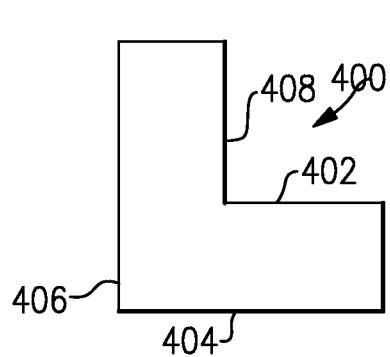
FIG. 4A is a simplified cross-section of a portion of a vane.

FIG. 4A shows an idealized vane 400. A gas path platform surface 402 may be defined, as well as a gas path airfoil surface 408. Similarly, a core platform 404, and a core airfoil 406 can be defined. In FIG. 4A, there is no fillet. The surfaces of the airfoil and the platform can be idealized to meet at a sharp point. As will be explained below, the sharp point need not be at a right angle, however, both surfaces can be idealized as being essentially straight at a location at which they meet.

Figure 4B:
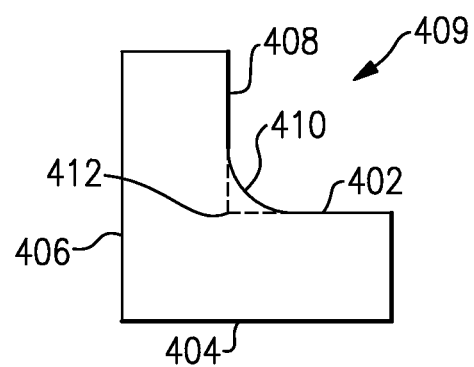
FIG. 4B shows a first fillet option.

FIG. 4B shows a vane 409 wherein a fillet 410 is formed on the gas path side, but wherein there is still no fillet on the core side. The fillet 410 has a length and a height that can be measured from a point 412.

Figure 4C:
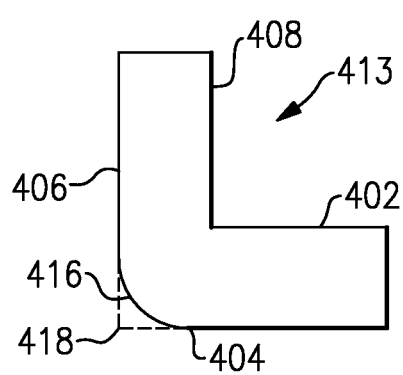
FIG. 4C shows a second fillet option.

FIG. 4C shows a vane 413 wherein the surfaces 408 and 402 meet at a right angle, and there is no gas path fillet. On the other hand, the core side surfaces 406 and 404 are provided with a fillet 416. The fillet 416 can be measured from an imaginary sharp point 418 at which the two surfaces 404 and 406 would meet if they extended in a further planar direction.

Figure 4D:
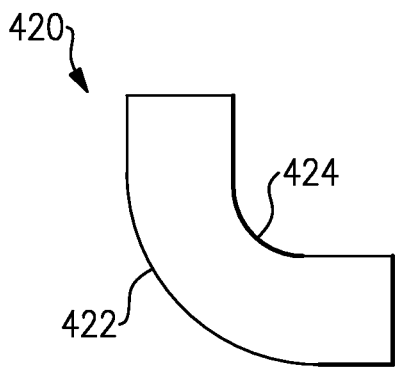
FIG. 4D shows a third fillet option.

A vane 420 is shown in FIG. 4D having a fillet 422 on the core side, and a fillet 424 on the gas path side. The height and length of these fillets would be measured from the same point as the FIGS. 4B and 4C embodiments.

Figure 4E:
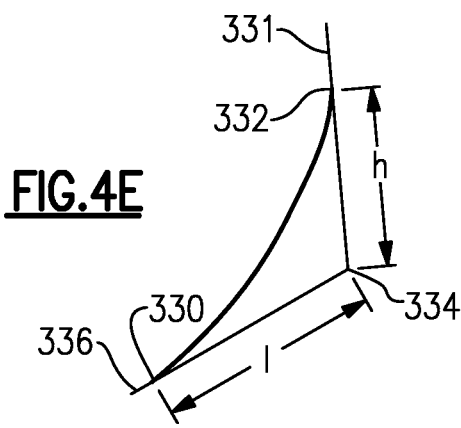
FIG. 4E graphically shows how a length and height of a fillet may be defined.

FIG. 4E shows how the fillet would be measured. In FIG. 4E, a surface 336 of the platform is imagined to be conic, and meeting a surface 331 of the airfoil which is imagined to be straight at a point of intersection 334 with the platform surface 336. A length of the fillet is measured between the sharp meeting point 334 and the end 330 of the fillet. A height is defined between the sharp meeting point 334 and an end 332 of the fillet along the surface of the airfoil 331.

In embodiments, a first length from the leading edge to the point 100 was 0.70 inch (1.778 centimeters). A height to the point 102 was 0.400 inch (1.016 centimeters). The uniform fillet, or spaced portion 108 had a length to the point 112 which was 0.250 inch (0.635 centimeters) and a height to the point 110 which was 0.250 inch (0.635 centimeters).

In embodiments, a length to the point 100 compared to the length to the point 112 was between 1.1 and 8.0, and more narrowly 2.5 and 5.6. In those same embodiments, a ratio of the height of the point 102 to the height of the point 110 was between 1.1 and 6.0, and more narrowly 1.5 and 3.5.

In embodiments, a ratio of the first length to point 100 to the height at point 102 was between 1.1 and 4, and more narrowly 1.5 and 3.0.

Again, the variable fillet may be utilized at both the radially inner and radially outer portions of the airfoil, and also at both core fillets. When used in the core portion, the variable fillet reduces weight, and allows a variation in wall thickness, along with addressing stress concentrations. It may also be employed to provide additional clearance to structures which may pass through the hollow core. When utilized on the outer surface of the airfoil that will be in the path of products of combustion, the enlarged fillet allows stress concentrations to be addressed at one location, such as the leading edge while still having a smaller fillet for improved aerodynamic flow in the path of the gas path. In addition, the smaller fillet also reduces weight when utilized in the flow path.

With the disclosed invention, adequate stress relief is provided at locations adjacent the leading or trailing edge while still maintaining reduced fillet area in the gas path.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A turbine vane comprising:
    an airfoil extending between radially inner and radially outer platforms, said airfoil extending between a leading edge and a trailing edge, and merging into facing surfaces of said radially inner and outer platforms;
    a variable fillet merging a facing surface of one of said radially inner and outer platforms into a wall of said airfoil, with said variable fillet having a length extending away from a surface of said airfoil and a height extending away from said facing surface of said at least one of said radially inner and outer platforms outwardly on to said airfoil, with said variable fillet having a greater length at one of said leading edge and said trailing edge, and a spaced portion having a shorter length at locations spaced from said at least one of said leading and trailing edges;
    the greater length and the shorter length are measured from a meeting point of a nominal surface of said at least one of said radially inner and outer platforms and said surface of said airfoil, and said height measured from said meeting point to an end of said fillet; and
    said airfoil has a hollow, and said variable fillet includes a core variable fillet merging an outer surface defining said hollow into said at least one of said radially inner and outer platforms.

2. The turbine vane as set forth in claim 1, wherein said at least one of said leading and trailing edges is said leading edge.

3. The turbine vane as set forth in claim 1, wherein a tapered portion tapers a length of said variable fillet from said portion associated with said leading edge to said spaced portion.

4. The turbine vane as set forth in claim 1, wherein a ratio of said greater length to said shorter length is between 1.1 and 8.0.

5. The turbine vane as set forth in claim 1, wherein said variable fillet is an outer variable fillet provided on a surface of said airfoil at said one of said radially inner and outer platforms in what will be an airflow path.

6. The turbine vane as set forth in claim 1, wherein said variable fillet is utilized at both of said radially inner and outer platforms.

7. The turbine vane as set forth in claim 1, wherein said variable fillet also having a greater height at one of said leading edge and said trailing edge and said uniform portion having a shorter height at locations spaced from said at least one of said leading and trailing edges.

8. The turbine vane as set forth in claim 7, wherein a ratio of said greater height to said shorter height is between 1.1 and 6.0.

9. The turbine vane as set forth in claim 7, wherein a ratio of said greater length to said greater height is between 1.1 and 4.

10. A mid-turbine frame comprising:
    a radially inner and radially outer platform, said radially inner and outer platforms including a plurality of vanes, with each of said vanes including a portion of said radially inner and said outer platforms and an airfoil connecting said portions of said radially inner and outer platforms;
    said airfoils extending between a leading edge and a trailing edge, and merging into facing surfaces of said radially inner and outer platforms;
    a variable fillet merging a facing surface of one of said radially inner and outer platforms into a wall of said airfoil, with said variable fillet having a length extending away from a surface of said airfoil and a height extending away from said facing surface of said at least one of said radially inner and outer platforms outwardly on to said airfoil, with said variable fillet having a greater length at one of said leading edge and said trailing edge, and a spaced portion having a shorter length at locations spaced from said at least one of said leading and trailing edges;

the greater length and the shorter length are measured from a meeting point of a nominal surface of said at least one of said radially inner and outer platforms and said surface of said airfoil, and said height measured from said meeting point to an end of said fillet; and said airfoil has a hollow, and said variable fillet includes a core variable fillet merging an outer surface defining said hollow into said at least one of said radially inner and outer platforms.

11. The mid-turbine frame as set forth in claim 10, wherein said at least one of said leading and trailing edges is said leading edge.

12. The mid-turbine frame as set forth in claim 11, wherein a tapered portion tapers a length of said variable fillet from said portion associated with said leading edge to said spaced portion.

13. The mid-turbine frame as set forth in claim 10, wherein a ratio of said greater length to said shorter length is between 1.1 and 8.0.

14. The mid-turbine frame as set forth in claim 10, wherein said variable fillet is an outer variable fillet provided on a surface of said airfoil at said one of said radially inner and outer platforms in what will be an airflow path.

15. The mid-turbine frame as set forth in claim 10, wherein said variable fillet is utilized at both of said radially inner and outer platforms.

16. The mid-turbine frame as set forth in claim 15, wherein said variable fillet also having a greater height at one of said leading edge and said trailing edge and said uniform portion having a shorter height at locations spaced from said at least one of said leading and trailing edges.

17. A gas turbine engine comprising:
a higher pressure turbine and a lower pressure turbine;
a mid-turbine frame positioned between said higher and lower pressure turbines, said mid-turbine frame mounting a bearing for supporting a shaft associated with at least one of said higher and lower pressure turbines;
a radially inner and radially outer platform, said radially inner and outer platforms including a plurality of vanes, with each of said vanes including a portion of said radially inner and said outer platforms and an airfoil connecting said portions of said radially inner and outer platforms;
said airfoils extending between a leading edge and a trailing edge, and merging into facing surfaces of said radially inner and outer platforms;
a variable fillet merging a facing surface of one of said radially inner and outer platforms into a wall surface of said airfoil, with said variable fillet having a length extending perpendicularly away from a surface of said airfoil and a height extending away from said facing surface of said at least one of said radially inner and outer platforms outwardly on to said airfoil, with said variable fillet having a greater length at one of said leading edge and said trailing edge, and a spaced portion having a shorter length at locations spaced from said at least one of said leading and trailing edges;

the greater length and the shorter length are measured from a meeting point of a nominal surface of said at least one of said radially inner and outer platforms and said surface of said airfoil, and said height measured from said meeting point to an end of said fillet; and said airfoil has a hollow, and said variable fillet includes a core variable fillet merging an outer surface defining said hollow into said at least one of said radially inner and outer platforms.

18. The gas turbine engine as set forth in claim 17, wherein said at least one of said leading and trailing edges is said leading edge.

19. The gas turbine engine as set forth in claim 17, wherein a tapered portion tapers a length of said variable fillet from said portion associated with said leading edge to said spaced portion.

20. The gas turbine engine as set forth in claim 17, wherein a ratio of said greater length to said shorter length is between 1.1 and 8.0.

21. The gas turbine engine as set forth in claim 17, wherein said variable fillet is an outer variable fillet provided on a surface of said airfoil at said one of said radially inner and outer platforms in what will be an airflow path.

22. The gas turbine engine as set forth in claim 17, wherein said variable fillet is utilized at both of said radially inner and outer platforms.

* * * * *